(12) United States Patent
Findlay et al.

(10) Patent No.: US 7,551,088 B2
(45) Date of Patent: Jun. 23, 2009

(54) ELECTRONIC VEHICLE TAG

(76) Inventors: W. David Findlay, 125 Brook Hollow Dr., Columbia, SC (US) 29229; Brian Bannister, 17 Stonebriar Rd., Columbia, SC (US) 29212

( * ) Notice: Subject to any disclaimer, the term of this patent is extended or adjusted under 35 U.S.C. 154(b) by 281 days.

(21) Appl. No.: 11/786,592

(22) Filed: Apr. 12, 2007

(65) Prior Publication Data

US 2008/0252457 A1    Oct. 16, 2008

(51) Int. Cl.
*G08B 13/14* (2006.01)
*G08B 5/22* (2006.01)

(52) U.S. Cl. ............. 340/572.1; 340/5.91; 340/572.8; 340/568.2; 340/905; 340/928; 40/200; 40/201; 40/204; 40/448; 40/591; 235/383; 235/385; 235/492

(58) Field of Classification Search ........... 340/905, 340/928, 988, 5.91, 815.45, 568.2, 572.1, 340/572.8; 40/200, 201, 204, 448, 584, 591; 235/383, 385, 492

See application file for complete search history.

(56) References Cited

U.S. PATENT DOCUMENTS

| | | | | |
|---|---|---|---|---|
| 5,105,179 A | * | 4/1992 | Smith ..................... 340/468 |
| 5,751,257 A | * | 5/1998 | Sutherland .................. 345/1.2 |
| 6,253,190 B1 | * | 6/2001 | Sutherland ..................... 705/20 |
| 6,641,038 B2 | * | 11/2003 | Gehlot et al. ................. 235/384 |
| 7,142,104 B1 | * | 11/2006 | Blueford ..................... 340/472 |
| 2003/0142044 A1 | * | 7/2003 | Berry .......................... 345/55 |
| 2005/0192744 A1 | * | 9/2005 | Maqui et al. ................. 701/211 |
| 2006/0213100 A1 | * | 9/2006 | McCann ....................... 40/591 |

* cited by examiner

*Primary Examiner*—Benjamin C Lee
*Assistant Examiner*—Lam P Pham

(57) ABSTRACT

The present invention consists of an electronic vehicle tag (EVT), which is preferably 12×6 inches. It consists of an encasement mountable by 4 screws to a motor vehicle. The front face is comprised of an electronic paper display technology, which requires no power consumption to maintain its image. The electronic paper display will hold a high resolution full color graphic design relating to the vehicle tag selected and tag information depending on the state of issuances requirements. The display is reflective and can be easily read in sunlight or dimly lit environments and at virtually any angle. The plate has an electronic paper technology for display, wireless communication transmitter/receiver, logic board for electronic paper manipulation, high impact encasement, and a battery pack. The battery pack is used to change the display when required. The electronic vehicle tag is independent of the vehicle in which it is attached.

13 Claims, 3 Drawing Sheets

Fig. 2 - Front – Non-power consuming, thin, high resolution color display. The background of the display can be any graphical image the issuing authority selects for any type of tag.
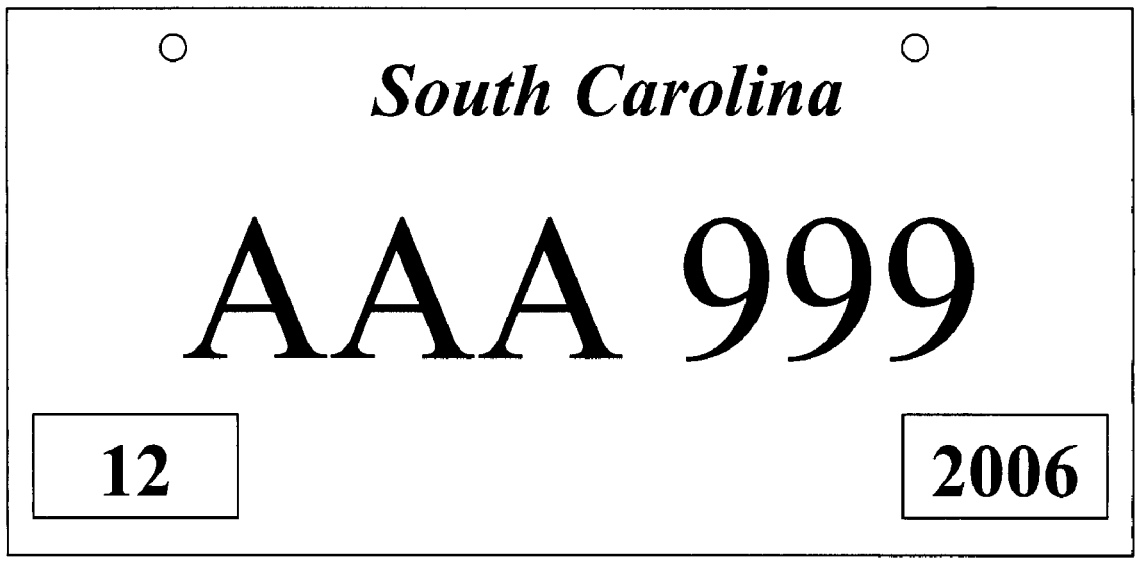
Fig. 3 - Side View
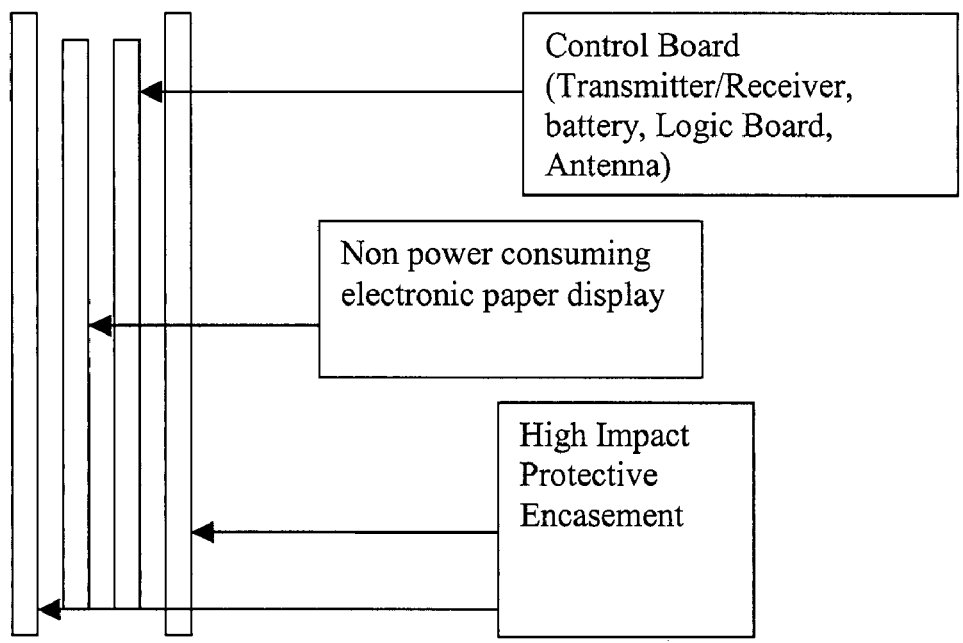

Fig. 4 – Operational Use
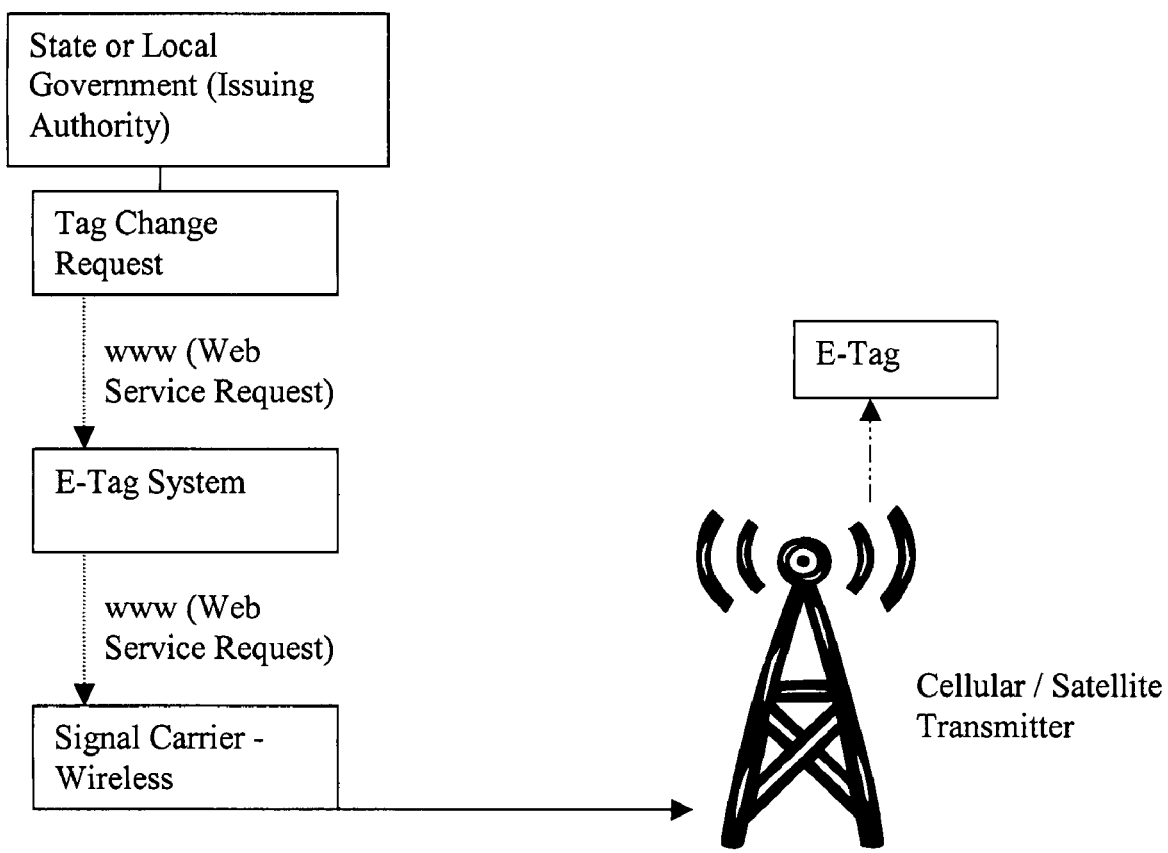

ELECTRONIC VEHICLE TAG

BACKGROUND OF THE INVENTION

1. Field of the Invention

This invention relates generally to an electronic vehicle tag.

2. Background

There are numerous companies that produce aluminum and digital vehicle tags. Unfortunately, despite the name "digital vehicle tags", such tags are not digital in any real sense, rather they are called "digital" because they are not stamped out, as are aluminum tags. In any event, existing aluminum and digital vehicle tags are not considered very sophisticated due to the lack of technology. For this reason it is quite easy for a driver to continue to drive the vehicle while under suspension because the current vehicle tag will still have a month and year decal that shows compliance. Law enforcement would not know it is suspended unless they call it in and check the status of the tag on the issuing authorities' computer system.

To date there has been little application of electronic compliance in the area of real-time vehicle suspensions, renewals or reactivations to an electronic vehicle tag that is fully independent of the vehicle it is issued to. By way of example, U.S. Pat. No. 5,105,179 to Smith, U.S. Pat. No. 5,621,571 to Bantli, U.S. Pat. No. 5,657,008 to Bantli and U.S. Pat. No. 6,404,327 to Naddeo all disclose various digital license plates, but none describe an electronic vehicle tag that does not use power to maintain a fully graphical display and which is completely independent of the vehicle it is issued to.

It would be desirable to have a device that allows a motor vehicle agency to instantly renew, suspend or expire a vehicle license plate regardless of the vehicle location by sending a signal of the new image and status, thus allowing law enforcement to easily recognize suspended or expired vehicles that are still operating on the roads. It would also be desirable to have a device that allows law enforcement to instantly send any type of warning message or image to a vehicle tag regardless of vehicle location (stolen, amber alert, etc.). Further, it would be desirable for motor vehicle agencies to be able to change the current vehicle tag type to a specialty tag, for example, upon the customer's request and without requiring new tags. Still further, it would be particularly advantageous to provide this aforementioned functionality while at the same time having a device that also retains its fully graphic image without power.

Therefore, what is needed is an electronic vehicle tag that maintains its image without power, and which further does not suffer from the aforementioned problems.

SUMMARY OF THE INVENTION

The present invention advantageously fills the aforementioned deficiencies by providing an electronic vehicle tag that maintains its image without power and which allows motor vehicle agencies, or other designated official, agency or issuing authority, to suspend, revoke or expire a vehicle tag instantly regardless of the location of the vehicle by changing the vehicle tag image. The electronic vehicle tag of the present invention can sustain can image without the need for power. In its preferred embodiment the present invention will also display high resolution, full color images. The image can instantly be changed regardless of vehicle location.

The present invention consists of an electronic vehicle tag which is 12×6 inches standard license plate size. It consists of an encasement mountable by 4 screws to a motor vehicle. The front is comprised of an electronic paper display technology, which requires no power consumption to maintain its image. The electronic paper display will hold a full color graphic design relating to the vehicle tag selected and other tag information depending on the specific state of issuances requirements. The plate consists of an electronic paper technology for display, wireless communication transmitter/receiver, logic board, high impact encasement, and a battery pack. The electronic vehicle tag is independent of the vehicle in which it is attached.

In one particular embodiment, the present invention is made of combining the electronic display technology with a logic board that consists of a non-power consuming transmitter/receiver and antenna, control unit/logic board and battery pack. This is encased with a high impact plastic housing that has the antenna built around the circumference within the casing. There is an electronic vehicle tag (EVT) for the purpose of displaying motor vehicle information and enforcement of the laws of the governing state or province. The unit consists of an encasement, battery, logic board, wireless transmitter/receiver, electronic paper display, unique identifying key, and housing in combination. In this particular embodiment, the battery is the primary power source of the EVT, with battery life expectancy preferably but not necessarily 5 or more years.

The logic board provides the EVT with a central processing unit, which is generally composed of a circuit board, microprocessor, and storage. The logic boards' primary function is to process security authentication of the signal and manage the manipulation of the electronic paper display.

The transmitter/receiver is used to manage communications, either cellular or satellite, between the managing authority and the logic board. The transmitter/receiver is assigned a specific addressable key. The transmitter/receiver only requires power from the battery in the event it receives its key. Once received, the signal is then passed on to the logic board for authentication and image manipulation data. Once specified actions are carried out the wireless transmitter/receiver can send a change successful to the carrier (cellular/satellite).

The electronic paper display is a thin single or multi-layered display. It is thin, bendable, weather resistant, and durable. It has the ability to display high resolution graphics with no additional power consumption to maintain the display.

The encasement comprises of a high impact plastic or polymer for the sole purpose of housing and protecting the electronic vehicle tag. It is preferably 12 inches by 6 inches and clear on the front for viewing of the electronic paper display. The back is opaque and sealed all through, with a plurality of holes, preferably 4, located in the plate for vehicle mounting.

The unique identifying key is a means to allow the wireless transmitter/receiver to communicate and be identified to the signal carrier (cellular/satellite). It enables the electronic vehicle tag to be identified and addresses by the wireless network. It also serves as a security measure to ensure only the governing entity may know and address the device. This is used similar to a MAC address assigned to each network card within a computer network. The electronic vehicle tag, once identified, may be addressed anywhere within reach of its carrier network. Utilizing cellular technologies of today, an electronic vehicle tag would be able to be addressed anywhere within cell phone communication distance. With the infrastructure with the United States today, the EVT would be available for communication virtually anywhere within the continental United States. Though not to be restrictive in its function, the electronic vehicle tag would be able to display virtually any image in an area that is preferably 12 inches by 6 inches. Though this capability is there, the purpose of the EVT is to identify and enforce the laws of the governing bodies who chose to implement this device for the purpose of motor vehicle and law enforcement.

In one particular embodiment of the present invention the issuing authority would register a vehicle in the same manner they currently do using the existing registration system, although it is certainly possible that other means of registration are possible and within the scope of this invention. The issuing authority would then assign the requested type (university, special interest, etc.) of vehicle tag to the vehicle. The issuing authority registration system would send the tag type requested information to the electronic vehicle tag (EVT) system. The electronic vehicle tag system would send a wireless signal to the electronic vehicle tag. The electronic vehicle tag would display the requested tag type with all the information and design, preferably but not necessarily in color. The issuing authority can also send the tag a renewal image, suspension image, revoked image or any type of display it requires. Law enforcement can also send any type of image or message they require (stolen, amber alert, etc).

In other embodiments, the present invention could be used in many forms of compliance needs by just changing the size required and placing the art on a secure adhesive on the back that is protected by a peel off cover. Use could be for such items as the International Fuel Tax Agreement annual decals used by all jurisdictions and Canadian Provinces. Or a jurisdiction/province issuing authority can opt to include this type of image on to the electronic vehicle tag.

In still other embodiments, the present invention is tamperproof. Specifically, in this particular alternative embodiment there is a binding connection holding the transmitter/receiver, the logic board, the electronic paper display and/or the battery together. If and when this binding connection is broken, stretched or otherwise compromised the display will become disabled. Similarly, if any of the transmitter/receiver, the logic board, the electronic paper display and the battery are separated, the display can likewise become disabled.

It is therefore an object of the present invention to provide a device that allows motor vehicle agencies or other designated official, agency or issuing authority to have instant compliance status notification by controlling the image displayed on the EVT.

It is another object of the present invention to provide a device that allows law enforcement to instantly send any type of warning message or image to a vehicle tag regardless of vehicle location (stolen, amber alert, etc.).

It is a further object of the present invention to provide a device that enables motor vehicle agencies, designated officials, agency or issuing authority to be able to change the current vehicle tag type to a specialty tag, for example, upon the customer's request and without requiring new tags.

It is still further an object of the present invention to provide the desired functionality while at the same time having a device that also retains its fully graphic image without power.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 2 is a front view of a particular version of the electronic vehicle tag representative of the present invention.

FIG. 3 is a side view of a particular version of the electronic vehicle tag representative of the present invention.

FIG. 4 is a flow chart that depicts a particular version of the process for changing the electronic vehicle tag upon request.

DETAILED DESCRIPTION OF THE INVENTION

Figure 1:
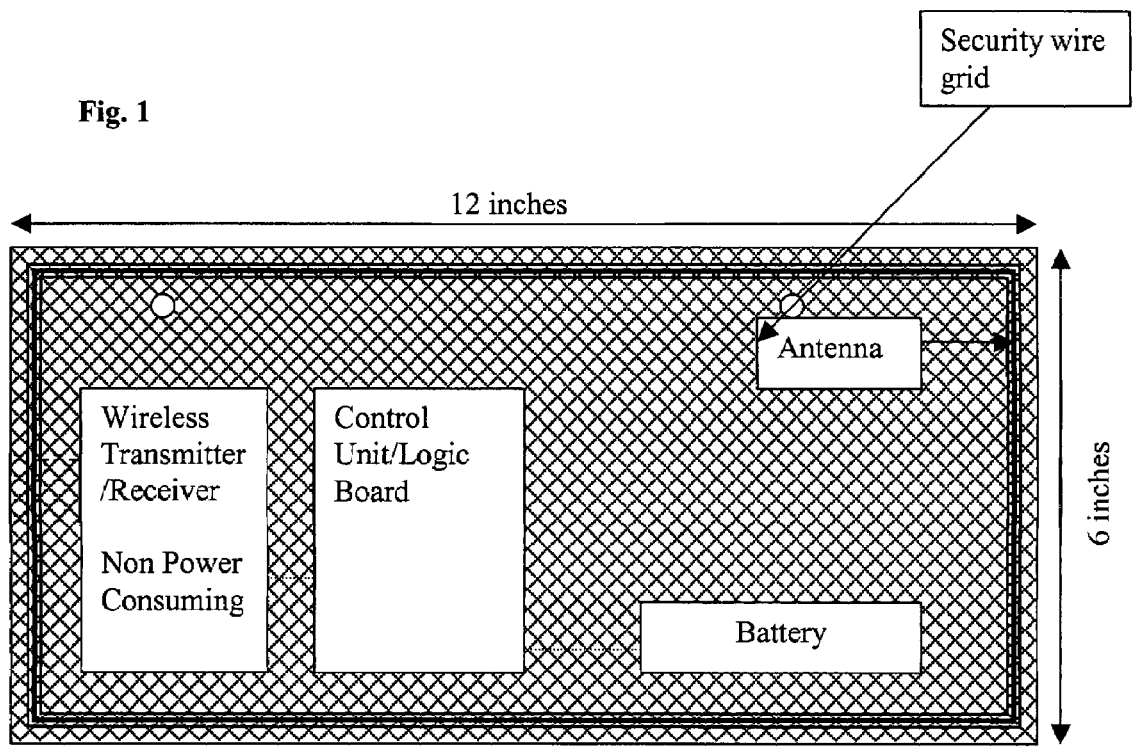
FIG. 1 is a back view of a particular version of the electronic vehicle tag representative of the present invention.

The present invention is directed to a high resolution full color graphic wireless electronic vehicle tag that maintains its image without power.

FIG. 1 illustrates the rectangular 12"×6" back view along with internal components. It should be noted that there is no particular need for the device to be 12 inches by 6 inches, although it is preferred. The components are on a control board and constructed as an internal board that will also be described in FIG. 3. FIG. 1 also shows that the embodiment will have an antenna built around the circumference of the electronic vehicle tag. This antenna is connected to the non-power consuming wireless transmitter/receiver. The control board also has a control unit/logic board and a battery power supply that is only needed to change the display image.

FIG. 2 illustrates a front view of the electronic vehicle tag. The front of the display is protected by a high impact clear protective encasement. The display is a non-power consuming, thin, high resolution color display. The display does not need power to retain the image for an indefinite amount of time. The background of the display can be any graphical image the issuing authority selects and can be changed by a wireless transmission of another display image FIG. 3 illustrates a side view showing the high impact clear protective encasement, the electronic paper display, the control board and the back plane. The front encasement and the back plane encase the electronic paper display and the control board.

FIG. 4 illustrates operational use. The Issuing Authority will preferably have an in-house registration system, although it should be understood that his could be outsourced to a third-party. The in-house registration system will have either an e-tag integration software module or proprietary in-house software with the ability to send a web service call. This web service call will include but not be limited to the following:

State Identifier
    State Security Key (Issuing authority specific)
    Tag Serial Number (which will preferably be stamped on back of e-tag)
    Plate Type (Specialty tags, University tags, etc.)
    Alphanumeric tag identifier
    Compliance information (Expiration date, Expiration month or any compliance information specific to the issuing authority).

The specified above web service call will post security validation, match the Serial Number on the tag to the Transmitter Identifier and to the logic units security key. Next E-tag system will generate a digital representation of the vehicle tag containing the tag display and relevant compliance information. This displayed information is specific to the issuing authority's requirement(s). E-tag system will generate a web service call containing the transmitter id, logic unit security key and digital representation of the tag to a wireless service carrier. The wireless service carrier sends the requested digital representation to the E-tag. E-tag displays the digital representation and sends a carrier specific confirmation back to the E-tag system. E-tag system notifies the issuing authority of the confirmation.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. An electronic vehicle tag comprising:
   an electronic paper display that maintains display of vehicle tag information without further consuming power;
   a wireless communication transmitter/receiver having a perimeter;
   a logic board having a central processing unit;
   a battery pack;
   an encasement having a front and a back both having a perimeter;
   a security wire grid substantially expanding the area of the encasement, and has the capability to accommodate a closed circuit connection;
   an antenna disposed along or within the perimeter of the encasement;
   wherein the transmitter/receiver, the logic board and the electronic paper display are all interconnected through said security wire grid using current conducting material;
   wherein upon tampering of the security wire grid, the electronic vehicle tag will become disabled.

2. The invention of claim 1 further comprising a binding connection holding the transmitter/receiver, the logic board, the electronic paper display and the battery together, wherein the display will become disabled if any of the transmitter/receiver, the logic board, the electronic paper display and the battery are separated.

3. The invention of claim 2 wherein the binding connection is a low amperage conductor.

4. The invention of claim 3 wherein the low amperage conductor is a ribbon cable.

5. The invention of claim 4 wherein the electronic paper display has at least a single display that changes depending on the instructions received.

6. The invention of claim 5 wherein the electronic paper display is a thin-film transistor liquid crystal.

7. The invention of claim 6 wherein the antenna is disposed around the perimeter of the wireless communication transmitter/receiver.

8. The invention of claim 7 wherein the wireless communication transmitter/receiver does not consume power except when a signal is being sent to change the display.

9. The invention of claim 8 wherein the encasement is made of a high impact plastic.

10. The invention of claim 9 wherein the encasement measures 12 inches by 6 inches.

11. The invention of claim 10 wherein the front of the encasement is clear.

12. The invention of claim 11 further comprising a plurality of holes disposed on the back of the encasement.

13. The invention of claim 12 wherein the plurality of holes are disposed around the perimeter of the back of the encasement.

* * * * *